United States Patent
Dobozi et al.

[11] Patent Number: 5,161,470
[45] Date of Patent: Nov. 10, 1992

[54] PROCESS FOR THE WATER-SAVING ECOLOGIC COLLECTION, TRANSPORT AND DEPOSITION OF SLAG AND FLYASH FROM COAL-FIRED THERMAL POWER STATIONS WITH THE SIMULTANEOUS UTILIZATION OF PHYSICAL AND CHEMICAL PROPERTIES

[75] Inventors: György Dobozi; Tamás Falusi, both of Budapest; Csaba Ignacz, Budarulasz; Tibor Moór, Budapest; Dániel Pongralz, Buolapest; Ahila Sziváu, Budapest; György Vámos, Budapest, all of Hungary

[73] Assignee: Energiagazdalkodasi Intezet, Budapest, Hungary

[21] Appl. No.: 514,005

[22] Filed: Apr. 25, 1990

[30] Foreign Application Priority Data

Apr. 25, 1989 [HU] Hungary ............... 1973/89

[51] Int. Cl.⁵ .................................. F23J 1/06
[52] U.S. Cl. .......................... 110/165 R; 110/171
[58] Field of Search ......... 110/170, 171, 168, 165 R, 110/165 A

[56] References Cited

U.S. PATENT DOCUMENTS

| | | | |
|---|---|---|---|
| 4,018,588 | 4/1977 | Handy, Jr. | 110/171 |
| 4,329,929 | 5/1982 | Jessen | 110/165 R |
| 4,512,265 | 4/1985 | Buchmuller et al. | 110/165 R |
| 4,599,951 | 7/1986 | Andresli | 110/165 R |
| 4,718,357 | 1/1988 | Wang et al. | 110/171 |
| 4,770,110 | 9/1988 | Teske | 110/165 R |
| 4,808,197 | 2/1989 | Ayers | 110/171 |
| 4,846,082 | 7/1989 | Marangoni | 110/170 |

Primary Examiner—Henry C. Yuen
Attorney, Agent, or Firm—Herbert Dubno

[57] ABSTRACT

A process is described for a water efficient, ecologically acceptable collection, delivery and depositing of slag and flyash from thermal power plants fired with pulverized coal. Slag is allowed to fall into a cooling water basin, conveyed to a condenser where it is combined with coarse flyash, te slag-flyash combination is delivered to a mixing space and combined with fine flyash, thereby forming a homogeneous mixture and the mixture is then circulated under specified conditions to achieve comminution to a predetermine value. Comminuted homogeneous mixtures is then measured continuously for properties of viscosity, quantity and pressure parameters. Information on the parameters is fed to a computer for comparison with preset values. The comminuted homogeneous mixture is then deposited in a deposit space. Any cooling water lost in the collecting-delivering and depositing steps is then replaced. A colloidal material may be added to the comminuted homogeneous mixture during the deposition step.

6 Claims, 1 Drawing Sheet

PROCESS FOR THE WATER-SAVING ECOLOGIC COLLECTION, TRANSPORT AND DEPOSITION OF SLAG AND FLYASH FROM COAL-FIRED THERMAL POWER STATIONS WITH THE SIMULTANEOUS UTILIZATION OF PHYSICAL AND CHEMICAL PROPERTIES

FIELD OF THE INVENTION

The invention relates to a process for the water-saving ecological collection, transport and deposition of slag and flyash from coal-fired thermal power stations with the simultaneous utilization of physical and chemical properties thereof. More particularly, the invention relates to a process in which during the collection of slag and flyash we establish the conditions for utilizing chemical agents contained in slag and flyash which are soluble in water, as well as physical characteristics of grains of slag and flyash, within the transport system of pipelines, and so that at the place of deposition of slag and flyash ecological criteria are satisfied.

BACKGROUND OF THE INVENTION

It is a well known fact that in thermal power stations fired with pulverized coal, from an incombustible part of the pulverized coal blown into the boilers, a residue of combustion—slag and flyash—results in the form of a solid granular aggregate. Slag falling out directly from the furnace chamber has a grain size of 0 to 20.0 mm, while flyash is carried away together with flue gases and represents a residue of combustion of the grain size of 0.0-0.50 mm, as precipitated from flue gases. Slag and flyash contain mineral components which are characteristic of the coal used and versions may occur which arise in the oxidizing atmosphere because of thermal effects in the furnace chamber.

Most frequently occuring minerals in coal barren:
Clay Minerals:

| | |
|---|---|
| Kaolinite | $Al_2(OH)_4Si_2O_5$ |
| Halloinite | $Al_2(OH)_nSi_2O_5 \cdot 2(H_2O)$ |
| Montmorillonite | $Al_2(OH_4)Si_4O_{10} \cdot H_2O$ |
| Carbonate minerals: | |
| Limestone | $CaCO_3$ |
| Siderite | $FeCO_3$ |
| Magnesite | $MgCO_3$ |
| Dolomite | $CaMg(CO_3)_2$ |
| Ankerite | $FeMgMn(CaCO_3)_2$ |
| Sulfide ores: | |
| Pyrite | $Fe_2S_2$ |
| Melnikovite | $FeS_2(H_2O)$ |
| Marcasite | $FeS_2$ |
| Lead Sulfide | $PbS$ |
| Copper quartz | $CuFe_2S_2$ |
| Zinc sulfide | $ZnS$ |
| Quartz | $SiO_2$ |
| Salts: | |
| Common salt | $NaCl$ |
| Sylvite | $KJCl$ |
| Gypsum | $CaSO_4 \cdot 2(H_2O)$ |

In the furnace chamber of boilers clay minerals release absorbed water $/H_2O/$ in the form of steam, while iron sulfide ores release sulphur $(S)$ in the form of a gas. Contained metals (AbFe, Cu, etc.), quartz $(SiO_2)$, salts (Na, K) melt in the furnace chamber and while being cooled, in the flow of flue gas, from tiny granular porous hollow melt spheres with gaseous inclusions, from quartz, vitreous spheres with gaseous inclusions are formed. From these polygonal needle-shaped flyash grains with sharp edges and confined by tiny plates are formed. Larger grains in a glowing state, falling out from the furnace chamber of the boiler into the cooling water below the boiler, wherein-as a consequence of quick cooling-porous slag grains with closed air inclusions are formed which have been shaped by steam. This latter phenomenon can be demonstrated by testing the density of slag grains. The density of slag grains formed from the same mineral depends on the size of the grain. For the sake of information we present the density of slag grains which fell out simultaneously from the furnace chamber of a power station. In respect to the order of magnitude these data characterize the density of slags coming from any power station fired with pulverized coal.

| Sieve analysis mm | Density of slag $g/cm^3$ |
|---|---|
| >10 | 1.014 |
| 10-6 | 1.053 |
| 6-3 | 1.150 |
| 3-1 | 1.629 |
| 1-0.5 | 1.647 |
| 0.05-0.25 | 1.824 |
| 0.25-0.1 | 2.012 |
| 0.1-0.063 | 2.120 |
| below 0.063 | 2.176 |

From these data it becomes obvious that in flyash, as well as in the slag, lower density of larger grains is caused mainly by the closed air-inclusions within the grains and by the porisity; accordingly, one of the characteristic physical feature of these grains lies in that they are not compact, are brittle and can be comminuted easily.

Carbonate minerals release carbon dioxide $(CO_2)$, iron oxides contained in the minerals also melt. At the same time Ca and Mg contents—in the bond CaO and MgO—appear in a solid aggregate, in fine grain structure both at the temperature of the furnace chamber and in a cooled state, mixed up with the grains of melts of metals, quartz and salts or adhering on their surface or are independently incorporated into the aggregate of slag and flyash, respectively.

Below we detail the characteristic mineral composition of slag and flyash:

| | |
|---|---|
| $SiO_2$ | 22-55% |
| $Fe_2O_3$ | 6-25% |
| $Al_2O$ | 5-55% |
| $CAO$ | 1-50% |
| $MgO$ | 3-15% |
| $SO_3$ | 3-25% |
| $P_2O_3$ | 0-0.5% |
| $TiO_3$ | 0.2-2,5% |
| $K_2O$ | 0.2-3% |
| $Na_2O$ | 0.16% |

Below we give the grain distribution of slag and flyash arising in a power station:

| Grainsize mm | Proportion of mass % |
|---|---|
| Grain distribution of flyash: | |
| >0.5 | 0.02 |
| 0.5-0.25 | 0.95 |
| 0.25-0.1 | 15.36 |
| 0.1-0.063 | 14.89 |
| 0.063-0.030 | 24.18 |

-continued

| Grainsize mm | Proportion of mass % |
| --- | --- |
| below 0.03 | 44.60 |
| Grain distribution of slag | |
| >10 | 1.41 |
| 10–6 | 2.05 |
| 6–3 | 2.48 |
| 3–1 | 3.56 |
| 1–0.5 | 4.80 |
| 0.5–0.25 | 14.48 |
| 0.25–0.1 | 31.61 |
| 0.1–0.063 | 20.57 |
| 0.063–0.03 | 11.26 |
| below 0.03 | 7.78 |

Temperature of the slag grains falling out from the furnace chamber will be determined by the temperature of the water in the basin below the furnace chamber for cooling the slag. In practice temperatures used lie in the range between 30° and 60° C.

The temperature of the flyash grains precipitated in bulk from the flue gases is equal approximately to the temperature of the flue gas. That means that in practice flyash grains with a temperature of 80°–140° C. arrive into the collecting bins of the precipitators.

As a consequence of mineral composition, temperature, shape of grains and structural layout of grains and grain structure, composition of the aggregate of collected slag and flyash, slags and flyashes have different physical and chemical properties.

Some of these properties have been utilized in cement production, the building industry, road construction etc. Knowledge of physical and chemical characteristics is imperative for delivering slag and flyash in mass mixed with water in pipelines and for deposition of them in aggregates of large area and extent.

In accordance with earlier practice in thermal power stations slag formed in the furnace chamber is allowed to fall into the water bath below the boilers, where it is cooled and some larger, possibly fused-together pieces are comminuted in breakers. Flyash with coarse grains precipitated mechanically from flue gases was flushed away in a water flow. Flyash with finer grains precipitated by means of electrofilters or filterbags from flue gases is generally collected in a dry state in air flow for using it—in consideration of their resultant properties—in cement plants as fillers or in plants producing cellular concrete as an additive etc.

According to general practice fine flyash in a dry state not having utilized yet could be mixed with slag, coarse flyash and water and delivered in pipelines to final depository places. As a consequence of admixing of slag flyash and water, some physical characteristics and the chemical composition of the individual components will change. Water cools the grains and elutriates mineral salts contained therein. To the extent there is elution physical and chemical properties of the slag and flyash grains, and the aggregate thereof will change. It goes without saying that mineral salts having been eluted from slags and flyash change compositions of the forwarding water and certain characteristics thereof.

Processes are known, in which slag and flyash has been collected within the thermal power plant and mixed with water; thereafter the mixture thus obtained is delivered through a pipeline to the deposition site, wherein the mixture is spread by means of surface stream and/or grains of slag are precipitated from the mixture. These processes are known as hydraulic collecting-transporting and depositing processes.

An earlier and frequently used process has in, in considerable water consumption and slag and flyash are collected, delivered and deposited in a considerably diluted state; in course of this process within the boiler slag and flyash are collected and in consideration of technical aspects of collecting equipments, collection is realized with a considerable water flow in the proportion 1:2–1:20 weight-% (solid matter:liquid). The highly diluted mixture thus obtained is delivered through a pressurized pipeline to the place of deposition. Here solid and liquid phases are separated by precipitation with a large water surface. Slag and flyash—now in a solid state—are deposited here, while the liquid phase is led to a collecting basin from the place of deposition and, in certain cases, may leak into the subsoil.

Hydraulic processes for collecting, delivering and depositing slag and flyash, in course of which a water quanity is equals in weight to the solid material aggregate, or it is even less, so that the content of solid matter is large, are considered as relatively new processes. In course of these processes the water quantity added to slags and flyashes is not more, than is needed for its hydraulic binding ability, i.e. hardening of the deposited material.

In this case a mixing process has been used, as a result of which the mixture of slag-flyash-water has characteristics of heavy liquids. From the point of view of delivering through a pipeline it can be stated that physical characteristics of slag and flyash grains being in a bulk state, namely size and density, enable delivery in a pipeline, if mixed with water.

It is a well-known fact that when allowing a sludge to flow in a pipeline, which is diluted with a considerable water quantity, i.e. in a proportion of 1:2 and 1:10 weight-% (solid matter-liquid), the sludge has flow properties, which are characteristic for the flow of heterogenous mixtures.

If the mixture does not flow with the proper velocity, as a consequence of the weight of larger grains the mixture will be separated to its original components. That means that liquid phase and solid matter are separated and solid grains precipitate in the pipeline. Hence this type of mixture can be allowed to flow in a pipeline with a flow velocity only, in the so-called turbulent range. The extent of turbulence, the so-called "critical velocity" can be characterized by the magnitude which keeps even the largest grains in the sludge in motion. Accordingly, the so-called "critical" velocity represents the lowest limit of turbulent flow. In the case of delivery of slag and flyash this value lies in the range between 1.5–1.6 m/sec. Below this limit delivery of slag and flyash, respectively, stops, in that in the pipeline larger solid grains no longer flow. That means that flow velocity of the mixture is to be kept above the critical velocity. If the content of solid matter becomes less, the missing quantity is to be replaced with water. For this reason there is no possibility to change the quantity of a mixture of constant density within a given pipeline within wide limits. As already mentioned, the lowest limit of the mixture to be delivered in the pipeline will be determined by the "critical velocity" for the diameter of the pipeline and grain composition of slag and flyash.

It is a well known fact that in course of the mixing process for preparing sludges with water quantities which are equal in weight to the solid matter aggregate or even less, i.e. 1:1–3:1 weight % solid matter liquid, special physical characteristics of fine flyash grains are utilized, as only with an aggregate with such a grain distribution and grain composition—0.0–0.50 mm—is it possible to obtain uniform distribution with a small quantity of water in the aggregate, by performing dynamic agitation to obtain a water layer of so-called molecular thickness on the surface of grains. As a consequence of dynamic mixing the mixture of flyash and water becomes liquefied—with the characteristics of heavy liquids—so it can be pumped and allowed to flow in a pipeline.

It is a well known physical phenomenon, that in the course of delivering liquid substances in a pipeline, temperature of the liquid medium influences the so called "loss of pipe friction" and accordingly economic parameters of the pipeline, as transporting means. Increased temperature reduces viscosity of liquid materials. Considerable change in viscosity appears mainly in liquids with higher viscosity (e.g. crude oil, residual oil, etc.).

With means delivering slag and flyash using a considerable water quantity, and slag and flyash of high temperature, the temperature of the mixture prepared with a large water quantity does not increase to such an extent, that one had to reckon with the effect of change in temperature, since the viscosity approaches that of clean water.

It has been proposed to provide thinner pipelines 100–200 mm—with heat insulation or to lay them into the soil to protect the line against freezing up, as it may happen that a mixture of 10° to 30° C. may freeze up on cold days and high velocity of wind, mainly in longdistance pipelines (10–20 km).

Ecological processes are also known. We, in this category, describe technical solutions seeking to eliminate dust contamination of the air from the surface of slag-flyash deposits of large volume and area and the elimination of chemical contamination of ground water and subsoil by waters leaking through the aggregate.

In order to be able to eliminate dust contamination, the surface of the deposition has to be covered with water or one must establish surfaces free of dust. To prevent contamination of subsoil and waters in the subsoil—having mostly drinking quality—water storing spaces must be isolated in a waterproof way so that the protection should yield proper safety even after stopping operation of the deposit.

As for deposit, one of the most characteristic features of slags and flyashes appears in the so called "hydraulic binding ability" resulting from the carbonate containing mineral components and size of the grains, furtheron, resulting from the grain distribution of slag and flyash aggregates and structure of the grains, with a majority of deposits. The joint-factor characterizes density and "permeability to water" or watertightness. These are in a close connection with one another, determining interconnection between deposits of large area and the atmosphere, environmental soil layers, as well as flow of ground water.

The hydraulic binding ability of the slag and flyash—in the case of a low content of CaO and MgO—does not develop when admixed with a considerable quantity of water in the traditional way. As a consequence grains of slag and flyash do not stick to each other in the deposit, so that air streams carry fine grains away from the dried surface of the deposit. That means that the surface of the deposit emits clouds of dust. At the same time, in the course of precipitation from water, grains of slag and flyash are separated according to grain size in compliance with topographic potentialities of the storing space. Accordingly, in course of precipitation deposits will be built-up of aggregates or layers of different grain sizes. Hence the factor of permeability to water, i.e. $5=10^{-2}$ to $10^{-3}$ cm/sec—will be different too. The joint coefficient, characterizing density of deposits, will be $e=0.9$ to 4.0.

With systems operated with the mixture of slag, flyash and water, with considerable dilution, a part of the salts released from slag and flyash gets into the forwarding water, while dissolved salts contaminate ground water flowing in the subsoil with undesired mineral components and trace elements. Deposits are found in mine pits, in the path of flow of surrounding ground water. They are interconnected with soil layers conducting ground water. Accordingly, contamination from the deposits can be reckoned with permanently.

According to experience, deposits consisting of the mixture of slag-flyash-water with a significant content of solid matter will never correspond to an aggregate of grains with a loose constitution. However, in dependence upon CaO and MgO content, compressive strength of 1 to 5.0 kg/cm$^2$ can be measured. An aggregate of this kind has a coefficient of permeability to water which is less by several orders of magnitude, so $K=10^{-5}$ to $10^{-6}$ cm/sec. There is no precipitating lake with a large water surface in the deposit space. Accordingly water containing harmful mineral salts does not leak into the subsoil and clouds of dust do not form on the surface of the deposit. As a consequence, deposit can be harmonized with environmental requirements. Although in this case the surface of the deposit is not covered by a water surface, but by virtue of adhesion between the grains the deposit will have a hard surface, dust formation stops. Within the deposits grains are not separated. Accordingly the aggregate of slag and flyash shows a homogeneous structure from the point of view of permeability, density of the deposit can be characterized by a joint-coefficient of $e=0.45$ to 0.85. The aforementioned coefficient relating to permeability to water—i.e. $K=10^{-5}$ to $10^{-6}$ cm/sec—does not mean an unambigous water-tightness as a part of rainwater and water from thawing of snow will leak through the deposit into the subsoil or ground water and which can be polluted by dissolved mineral salts.

Processes for producing homogeneous sludges are also known. As an example let us mention the process as described in the Polish Patent 185,413 in course of which dry flyash and water are charged into a mixer where it is mixed. By the alternating operation of at least two pieces of equipment a mixture is produced in a proportion of 1:1 to 3:1 (flyash-water). This process is completed by the process as described in another Polish Patent Specification 185 795, in the course of which into the mixture of flyash and water—as obtained from the aforementioned mixer—slag is admixed, in such a manner the mixture thus obtained is delivered to the deposit area through a pipeline.

A further process is known from the Polish Patent Specification 245 199, in course of which a mixture consisting of slag-flyash-water with a high content of solid matter is produced, and so that mixing flyash with water is effected continuously, while in the final phase of the process slag formed in the furnace chamber is admixed too. The solution is completed by the Polish Patent Specification 246,465, which uses a mixer for realizing the aforementioned process.

Hungarian Patent Applications 7293/83, 7928/84 and 15492/87 are considered as developments of the above mentioned Polish Patents since they describe continuously operated equipment and highly concentrated mixture of slag-flyash-water are produced by the previous mixing of slag with water.

The Polish Patent Specification 181 295 relates to the deposition of slag and flyash coming from thermal power stations. This process can be characterized in that the mixture of flyash and water, containing solid matter in a high proportion 1:1 −2.5:1 is led to the place of deposition, wherein coefficient of permeability to water max, $K = 10^{-7}$ cm/sec and compressive strength equals a min. is 3.0 kg/cm².

If environmental conditions require a higher strength, known binding materials, so e.g. hydraulic lime, slacked lime and other chemical agents could be added in a quantity of 6 weight %. These ingredients increase or replace the effect of binding materials, like CaO and MgO.

Hungarian Patent Application 2343/88 yields the possibility of depositing a mixture consisting of slag and flyash containing a considerable quantity of solid matter, the aim is to utilize flow properties of viscous liquids.

According to the Polish Patent Specifications an indispensable requirement is in that in course of delivering the flyash-water mixture with a high content of solid matter and with the subsequently admixed slag, delivery in a pipeline requires a flow with the velocity of 1.1∼1.2. Below this velocity larger slag grains precipitate and will be separated from the flyash-water mixture. If there is no possibility to establish the minimal velocity of flow, discontinuous operation gives the right solution. That means that one has to provide for buffer storage, in which flyash and slag are stored in a dry state as long as the quantity is staying at disposal which can be forwarded in a given pipeline with the required velocity.

It can be stated that for both mixing processes according to the Polish Patent Specification the use of so called industrial water was proposed for producing the mixture of flyash and water. This water comes from the water supply system of the thermal power station. Since the temperature of the water corresponds mostly to ambient temperature, the water cools the flyash-aggregate of high temperature to such an extent, that the pipeline—delivering to a longer distance—must be protected against frost because the heat contained in slag and flyash cannot be utilized.

It can be stated that none of the Hungarian Patents—relating to processes and equipments—contains elements by the aid of which unrestricted change of mixture flow within a given pipeline can be realized unambigously, enabling production of a mixture with higher temperature and to reduce permeability to water on the single deposits to such an extent that the deposit could be qualified as watertight.

It can be stated that binding materials containing CaO and MgO require carbon dioxide ($CO_2$) contained in air, to assure hydraulic i.e. carbonate, binding. However, as shown by experience—in deposits of considerable thickness binding cannot be realized in the absence of air. Accordingly, even if additives are added in accordance with the Polish Patent Specification 221 769, neither higher strength, nor complete watertightness can be achieved in deposits with thicker layers. Hardness of a carbonation origin will be formed but on the surface of the deposit, the importance manifests in the dust-free surface of the deposit.

OBJECT OF THE INVENTION

The object of the invention is to provide an improved process of the type described in which slag grains falling out from the furnace chamber of the boiler are used, the bulk wet aggregate formed therefrom and the flyash grains separated from the flue gases at different places and the dry flyash aggregates formed therefrom which show special physical and chemical properties, are so combined as to enable deposition of slag and flyash which meets requirements of ecology, by using collecting-transporting and depositing means which promote utilization of physical and chemical features of slag and flyash.

SUMMARY OF THE INVENTION

We have found that, in the course of mixing slag and flyash mixtures of high concentration, when the mixture is allowed to stream in a sludge pump with rotary blades and in pipelines with a properly high velocity, larger slag and flyash grains become comminuted and as a consequence of comminution the coefficient of unevenness of grain composition within the mixture can be reduced. Accordingly, the grains size will lie in a lower range of grains. Comminution can be increased so that within the mixer either duration of mixing is shortened, or intensity of mixing and flow is increased.

As a consequence of comminuting the grains rheologic properties of the mixture will also change, partly because larger grains are comminuted and grain distribution is displaced to the range of finer grains, partly upon the effect of more intensive agitation make-up water will be distributed more evenly on the surface of smaller grains. Due to conversion of the grain range, the viscosity of the mixture will be less, the mixture will be more flowable. The mixture has properties which are characteristic for the flow of homogeneous sludges—the so called Binghamian plastic sludges that means that in a pipeline laminar and turbulent flow can be equally realized and theoretically there is no limit to flow of grains.

As a consequence, it is possible to change density and quantity of homogeneous sludges with a plastic behavior within a pipeline.

In course of our tests, we have found that there is a determinable connection between the viscosity and the range of distribution of grains in the mixture. In course of laboratory tests it could be stated, that as a consequence of comminution of grains an increased liquified state can be distinguishe from the viscosity resulting from the water layer covering the grains. In such a manner for every material arising in thermal power stations, based on preliminary laboratory measurements, a value of viscosity can be well determined, which is characterizing different grain ranges. In such a manner, by continuously measuring viscosity comminution of grains can be measured for the whole range of grains with a satisfactory approximation.

As has been mentioned previously, comminution of flyash and slag affect permeability to water of the deposit, joint coefficient and strength of the surface of the aggregate. With aggregates with slag-flyash grains belonging to the finer range of grains, permeability and volume decrease by an order of magnitude. At the same time, using basic material with advantageous properties mixtures may be prepared, by the aid of which a nearly watertight layer can be obtained. By proper choice of mixing requirements directed to avoidance of soil contamination can be met.

We also recognized that even the most strict requirements directed to watertightness can be met. This means that the with material layers waterproofness may be achieved, if in deposit layers can be waterproof, if in the properties, so e.g. clay grist, bentonite, in a quantity of about 3 to 5 is added to the mixture of slag and flyash. While mixing, the material of colloidal state, the bentonite contacts make-up water and upon mixing with it will be uniformly distributed between solid grains of slag and flyash in such a manner that gaps between grains are filled and impermeability can be achieved. As bentonite does not increase the strength of grain aggregate, as a result an elastic insulating layer is formed with a shrinkage coefficient less than that of the clay layer. Watertightness depends—to a certain extent—on the intensity of mixing. In such manner optimal permeability can be achieved, since increased intensity reduces grains of slag and flyash to the optimal size and gaps inbetween are also filled with bentonite in a colloidal state. Using slag-flyash mixed with bentonite, similarly to the watertight insulation made of clay, a layer of optional thickness can be formed on the overland level of a newly opened deposit for protecting subsoil and ground water flowing therein. Simultaneously, an earlier opened deposit can be covered to exclude rainwater. Insulating layers may be formed in the course of depositing. At the same time deposition can be brought into compliance with environmental conditions. We have also that the reduced joint coefficient allows solid matter—increased by an order of magnitude—to be deposited.

We have also recognized, in so far as temperature of slag and flyash falling out of the boiler space is high, that none of the earlier collecting - transporting - and depositing processes have ever reckoned with the utilization of this heat quantity. In course of our tests we could observe, that in the flow of the homogeneous mixture of slag-flyash-water simultaneously with a temperature rise of 10° C. shearstress decreases by 20 to 30%. As a consequence, when homogeneous mixtures of higher temperature are allowed to flow, we may reckon with a smaller pipe-friction loss. Since pipe-friction loss of homogeneous sludges is larger by an order of magnitude than pipe-friction losses of so called heterogeneous mixtures, when homogeneous mixtures of higher temperature are allowed to flow in a pipeline, considerable pumping energy savings can be achieved.

A further advantage of mixtures with higher temperatures is in that protection of pipelines against freezing up—even with long-distance pipelines (10–20 km)—can be omitted. Accordingly, it seems to be expedient to accumulate the heat content of flyash and to use processes of mixing and collection, in which the heat loss is minimal.

We have also found that it is expedient to manage well the CaO-MgO quantities being present in slag and flyash. Both materials are soluble in water, dissolution requires a certain time and water predetermined temperature. Accordingly, it is proposed to apply hydraulic collection methods when accumulating slag and eventually coarse flyash, which assures required duration and temperature for the dissolution of CaO and MgO and promotes concentration of lime content. In such a manner conditions for hydraulic binding of slag and flyash in the deposit can be established.

Experiences gained in thermal power plants show that with the majority of thermal power stations make-up water used for the delivery of slag and flyash is mostly hard water due to carbonates contained (CaO and MgO content is too high) therein. As a consequence, scale sedimentation in collecting bins, in which slag and flyash used to be collected, makes operation of the system troublesome.

We, have also recognized that in the hydraulic accumulating system softened water with a high pH-value should circulate and it is considered as advantageous to soften the circulated water by utilizing CaO present in coarse flyash or slag.

We have found that flow of the softened water yields a more preferable pipe friction coefficient in the pipeline. Accordingly delivery and circulation of slag and flyash mixed with softened water results in savings in pumping energy.

Further, we have discovered that utilization of chemical and physical properties of slag and flyash becomes possible only by using a complex process, enabling that slag and flyash from thermal power stations heated with pulverized coal to be collected so as to save water and to forward them to the deposit in compliance with ecological requirements.

Accordingly, the invention relates to the water-saving and ecologic collection-delivery and deposition system of slag and flyash from thermal power stations heated with pulverized coal utilizing physical and chemical properties, in course of which slag from the furnace chamber of the boiler is allowed to fall into a basin with cooling water. From this basin it is forwarded by means of a scraping conveyor and overflow into a condenser or concentrator. Coarse flyash from one or more collecting bins is led to the same or concentrator through a duct or channel by water-flow. Thereafter fine flyash precipitated electrostatically or by means of filter bags—is led from below the precipitator to the mixer in a dried state in air flow, either through a silo or directly. Slag carried by the water flow and coarse flyash are thus mixed with fine flyash. A major part of the mixture is put into circulation so, in so far as the larger part—starting from the mixing space of the mixer bin and forced by means of the mixing pump through the mixing pipes—is fed back into a mixerbin, in such a manner flow properties being characteristic for homogeneous slag-flyash—mixtures a smaller part of the homogeneous mixture is led from the mixing space of the mixer bin to the deposit, namely in a pressurized pipeline of a hydraulic conveyor system. Thereafter the homogeneous mixture of slag and flyash is led to the deposit. Water which has been used up during the abovementioned process is replaced in the cooling basin.

A novel feature of the process according to the invention is that for collecting slag and coarse flyash in the condenser, the water quantity needed for the maximal dissolution of CaO-content of coarse flyash—determined by the time needed—is put into circulation in a pre-determined space. Slag and coarse flyash coming from the condenser are pumped with a water quantity which is less by weight than that of the flyash in order to admix it to the fines. Meanwhile larger grains of slag and flyash are put into turbulence and comminuted by the impact of flow.

Comminution is carried out to such an extent that from the aforementioned components a mixture is produced, containing grain sizes in the range 0.1–0.3 mm to 80%. Comminution of slag and flyash grains can be increased by changing the velocity of the flow in the mixing pipes and/or to by increase the quantity of the mixture put into circulation as long as grain composition and grain distribution reach the values which are indispensable for the coefficient of permeability prescribed for the deposit and for rheologic parameters needed for the delivery in pipelines. At the same time, the quantity of the homogeneous mixture of slag and flyash to be delivered to the deposit by means of the hydraulic conveyor is so chosen that it should carry with itself slag and flyash arising in different quantities in the thermal power plant. Grain composition and grain distribution of the homogeneous mixture will be determined on basis of laboratory tests, for continuous measuring of viscosity, correlated measuring of quantity and pressure and the continuous computer-aided evaluation of the results received.

On the deposit a layer consisting of the homogeneous mixture of slag and flyash for covering the subsoil and the deposit itself, having a permeability determined by requirements directed to ecology, is formed. In the spaces lying in between layers with different degrees of waterproofness are formed. In course of forming the deposit, surfaces with inclinations are formed, which promote removal of rainwater from the deposit surface, both in course of operation and after having filling up of the deposit space and recultivation.

A further novel characteristic is in that in course of collection, by accumulating heat content of slag and coarse flyash and by dissolving CaO content therefrom, soft water is obtained with a pH-value of 8 to 11. Thus, from slag, coarse and fine flyash a homogeneous mixture of the temperature of 60° to 80° C. is prepared, which is led through the pipeline without insulation to the deposit.

It is considered as a new element, that by adding 1 to 5 weight % colloidal material to the mixture comprising slag, fine and coarse flyash, watertightness of the homogeneous mixture can be increased. That means that coefficient of permeability may be reduced.

It is considered as a novel feature that by circulating softened water, a water incrustation can be hindered.

The water quantity used up in the course of collecting, delivering and depositing should be replaced from the clean water flowing out from the supplying means of the hydraulic conveyor system, by utilizing the pressure of the filling pump of the supplying means.

BRIEF DESCRIPTION OF THE DRAWING

One of the possible modes of implementation of the process according to the invention is detailed with reference to the accompanying drawing in which the sole FIGURE is a diagram of an apparatus for carrying out the process according to the invention.

Specific Description

Figure 1:
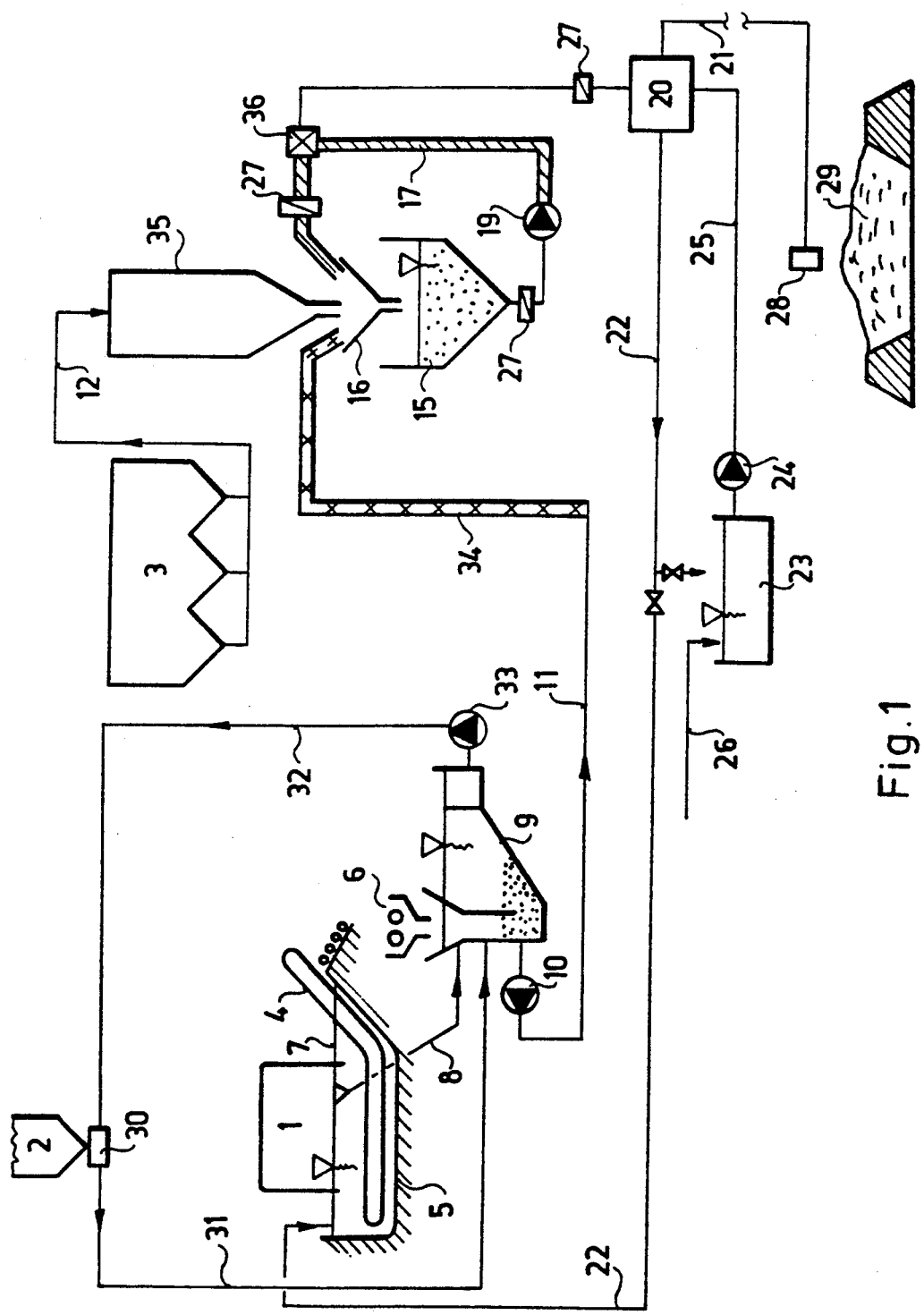

Slag grains falling out from the furnace chamber 1 of the boiler of the thermal power plant fired with pulverized coal fall into the basin 5 below the boiler for cooling the slag, cooled grains are scraped out from the water, forwarded on a scraper conveyor 4 and arrive via the breaker 6 at the concentrator 9. Slag grains suspended in the cooling basin 5 arrive through the overflow 8, carried away by the water flow into the condenser 9 too. Coarse flyash separated mechanically from flue gases is led to the collector bin 2 and it is flushed through the washer 30. Then it passes through the pipeline 31—carried by water—to the concentrator.

Water overflowing from the concentrator 9 is forwarded by the circulating pump 33, through the pressure line 32 into the washer 30 and/or to the slag cooling basin 5. Accordingly, the water present in the concentrator is allowed to circulate continuously.

Flyash precipitated in the electrofilter 3 flows through the air-channel 12—air-borne—into the silo 35. Mixer bin 16 is arranged below the silo 35. Fine flyash flows evenly from the silo 35. Condensed slag and coarse flyash are pumped from the concentrator 9 by means of the sludge pump 10 into the mixer bin 16 through the pipe lines 11 and 34. In the course of passing with a high velocity larger slag grains are comminuted.

The number of revolutions of the sludge pump 10 is to be chosen so that slag and coarse flyash are forwarded from the concentrator 9 into the mixer bin 16 by means of a water quantity which is less than the quantity of fine flyash being forwarded from the silo 35 to the mixer bin 16.

In the mixer bin 16 fine flyash coming from the silo 35, slag and coarse flyash arriving through the pipelines 11, 34 and softened and heated water—carrying slag and coarse flyash—are mixed in the mixer 15. The proportions of slag, coarse flyash and fine flyash: to 80% if the grain range is 0.1–0.3 mm.

The mixture having been mixed in the mixing space 15 of the mixer bin 16 is pumped by means of the mixing pump 19. Thereafter it is recirculated—so that about $\frac{2}{3}$–$\frac{3}{4}$ of the original quantity—passes the mixing—pipes 17 into the mixer-bin 16, while in the mixing pipes 17 comminution of larger slag and flyash grains continues. In such a manner a homogeneous mixture of slag and flyash will be obtained.

A smaller part of the sludge pumped by the mixing pump 19 from the mixing space 16 of the mixer-bin 16 is allowed to flow to the storage space, flowing through the charging means 20 of the hydraulic conveyor and the pipeline 21 to the deposit 29.

Continuous adjustment of water-tightness of the deposit, as well as rheological parameters of the hydraulic conveyor means taken place by instruments 27 upstream the mixing pipes 17 and after, measuring quantity, viscosity and pressure, assuring accurate results by computer-aided processing.

Charging means 20 of the hydraulic conveyor are actuated by the pump 24 delivering clean water, through the pipe line 25, while clean water discharged from charging means 20 leaves through the outflow-pipeline 28. It is led either into the slag cooling basin 5 or the basin 23 for clean water. Water replacement needed for the removal of slag and flyash arrives through the replacing pipeline 26 discharging into the basin 23.

The homogeneous mixture consisting of slag and flyash arriving through the delivery pipeline 21 to the deposit 29 is arranged laminarly. To prepare the layers for the subsoil and for the watertight layers to cover the deposit, we add bentonite from the bentonite-silo 36 into the mixer bin 16, while the intermediate layers are made without admixing bentonite.

We claim:

1. Process for a water-saving ecological collection, delivery and depositing of slag and flyash from thermal power plants fired with pulverized coal, simultaneously utilizing physical and chemical properties, comprising:

(a) causing said slag to fall into a cooling water basin from a furnace chamber of a boiler;

(b) conveying at least partly said fallen slag with a scraper-conveyor from said basin through an overflow into a condenser;

(c) flushing coarse flyash, at a same time with said conveying of fallen slag, through a first pipeline from a washer to said condenser thereby collecting together said slag-flyash, and circulating said collected slag-flyash with a quantity of water in a system of given volume for a time sufficient to achieve maximal dissolution of any CaO content in said slag-flyash;

(d) precipitating electrostatically or in filter bags fine flyash and delivering said fine flyash from below a separator airborne or through a silo or directly to a mixer bin;

(e) pumping said slag-flyash, in a quantity of water that is less in weight than that of said fine flyash intended to be admixed therewith, from said condenser to said mixer bin through a second pipeline wherein turbulent mixing is conducted thereby comminuting by impacted flow larger grains of said slag-flyash;

(f) mixing in a mixing space said slag, said coarse flyash carried by said water and said fine flyash to form a mixture, said coarse and fine flyash lying in a low average proportion range up to about 80% where grain size is 0.1–0.3 mm;

(g) circulating at least a major part of said mixture by means of a mixer pump through mixing pipelines from said mixing space and recycling said mixture back to said mixer bin thereby forming a homogeneous mixture, said circulation comminuting said homogeneous mixture, comminution being enhanced by increasing velocity and also by increasing quantity of said circulated homogeneous mixture, said circulation being continued until said homogeneous mixture achieves a grain composition and distribution value sufficient to achieve a coefficient of water permeability predetermined for deposit and rheological parameters required by said mixing pipelines;

(h) measuring viscosity, quantity and pressure parameters of said homogeneous mixture in a continuous manner and feeding information on said measured parameters to a computer for comparing said measured parameters with preset parameter values;

(i) depositing a smaller part of said homogeneous mixture from said mixing space to a depositing space via a hydraulic conveyor pipeline to deposit a series of layers, a final set of said layers having a coefficient of water permeability complying with environmental requirements while intermediate layers deposited below said final set having a different coefficient of water permeability, said deposit layers having surfaces that are inclined to draw away rainwater therefrom, said incline being present during said deposition step, subsequent to fully completing deposition and present after recultivation; and (j) replacing from said cooling water basin any water used up in said collecting-delivering and depositing steps.

2. Process as claimed in claim 1, wherein during collecting heat is allowed to accumulate in said slag-coarse flyash carried with water and CaO is dissolved therein to soften said water to pH 8 to 11, and wherein a combination of said soft water, slag, coarse flyash and fine flyash homogeneous mixture is heated between 60° and 80° C. and is led to said depositing space freely through further pipelines without insulation.

3. Process as claimed in claim 1, wherein said slag and coarse flyash are collected by being placed into soft water pH 8 to 11.

4. Process according to claim 1, further comprising adding a material with colloidal properties to said homogeneous mixture during preparation thereof.

5. Process according to claim 1, further comprising spraying a material with colloidal properties onto at least one of said deposited layers.

6. Process according to claim 1, wherein charging means are present for depositing said homogeneous mixture onto said depositing space and said replacement water for said collecting-delivering and depositing steps is supplied from clean water discharged from said charging means by using pressure from a sludge pump of said charging means.

* * * * *